United States Patent

[11] 3,614,313

[72] Inventor Milton Alden
Needham, Mass.

[21] Appl. No. 765,762
[22] Filed Oct. 8, 1968
[45] Patented Oct. 19, 1971

[73] Assignee Alden Research Foundation
Brockton, Mass.

[54] SCANNING APPARATUS SUPPORT STRUCTURE
11 Claims, 3 Drawing Figs.

[52] U.S. Cl. .......... 178/7.6, 178/6.6, 178/DIG. 27
[51] Int. Cl. .......... H04n 1/24
[50] Field of Search .......... 178/6.8, 7.6, 6.6, DIG. 27

[56] References Cited
UNITED STATES PATENTS
3,200,194 8/1965 Rabinow .......... 178/6.8

*Primary Examiner*—Robert L. Griffin
*Assistant Examiner*—Joseph A. Orsino, Jr.
*Attorney*—Norman S. Blodgett

ABSTRACT: This invention relates to scanning apparatus and, more particularly, to apparatus for converting a visual image into an electrical communications signal for reconversion at a remote station.

MILTON ALDEN
INVENTOR.

BY Norman S. Blodgett

SCANNING APPARATUS SUPPORT STRUCTURE

BACKGROUND OF THE INVENTION

In the past, it has been common practice to transmit visual images through a distance by use of a scanning apparatus transmitting to a recording apparatus. Usually, the scanning apparatus involved a photoelectric cell and a transducer, while the recording apparatus used electrodes between which were passed a paper impregnated with an electrosensitive chemical. It has been suggested that such methods of graphic communication could very well take place in the same way that a telephone is now used, i.e., as a matter of everyday usage. However, both the scanning apparatus and the recoding apparatus evolved in the past have been large and cumbersome as well as very expensive. Also, they have required maintenance by highly skilled workmen. Attempts to reduce the size of the scanning apparatus and to simplify it for low cost and ease of maintenance have been less than successful. Attempts to reduce the size and to make such scanning apparatus less expensive have resulted in failure due to lack of picture definition and machine reliability. This last factor has shown itself particularly in the feeding mechanism where the movement of the copy over the scanning line at a constant predetermined rate is particularly important for the satisfactory reproduction at the recorder. Furthermore, in reducing the size of the scanning apparatus, in the past, the ability to handle large sheets of copy (even though smaller portions are to be transmitted) has been lost, so that it has been necessary to cut such large copy into smaller pieces to transmit them, a very undesirable type of operation. These and other difficulties experienced with the prior art devices have been obviated in a novel manner by the present invention.

It is, therefore, an outstanding object of the invention to provide a scanning apparatus which is simple in construction and inexpensive to manufacture.

Another object of this invention is the provision of a scanning apparatus which is extremely reliable in operation and which is free of maintenance problems.

A further object of the present invention is the provision of a scanning apparatus which is small in size and which, nevertheless, is capable of accommodating fairly large copy and feeding it accurately past a scanning slot.

It is another object of the instant invention to provide a small-size scanning apparatus which is capable of giving excellent definition.

A still further object of the invention is the provision of a scanning apparatus having a relatively simple and rugged feeding mechanism which, nevertheless, is capable of accurate feeding of copy past a scanning slot.

A further object of the invention is the provision of a scanning apparatus whose controls and operative elements are at eye level to provide ease for observation.

Another object of the invention is the provision of a scanning apparatus arranged so that it is only necessary for the operator to drop the copy into the machine; feeding will take place automatically, and will automatically stop and hold the copy when the copy has passed through the scanning area.

With these and other objects in view, as will be apparent to those skilled in the art, the invention resides in the combination of parts set forth in the specification and covered by the claims appended hereto.

SUMMARY OF THE INVENTION

In general, the present invention has to do with a scanning apparatus having a housing with a vertical flat face on one side and a light tube and scanner at the other side, the apparatus having a pair of U-shaped arms. Each arm is pivotally attached at the free end of one leg to an upper corner of the housing for hinged movement about horizontal axes which are perpendicular to the face from a first position along the respective side of the housing to a second position at a right angle thereto. Furthermore, a faceplate of the same general configuration as the face is supported solely by pivotal attachment to the free end of the other leg of each arm, the faceplate being supported thereby in a position parallel to and spaced from the face. The faceplate is formed of a transparent material and limited portions at the upper corners of the faceplate are displaced away from a main portion, so as to be parallel to and spaced from the face a greater distance than the said main portion.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
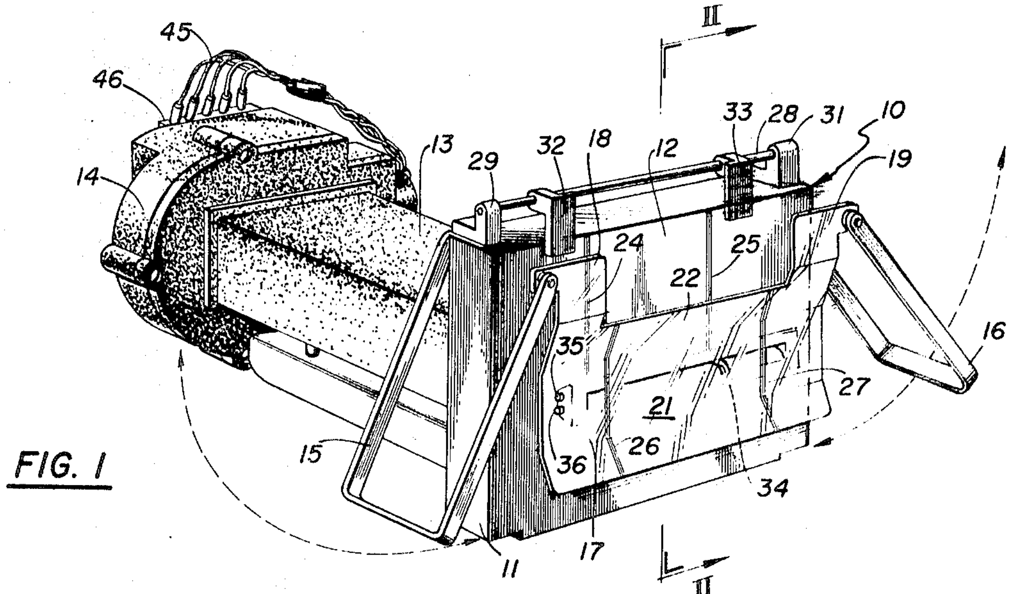
FIG. 1 is a perspective view of a scanning apparatus embodying the principles of the present invention.

Referring first to FIG. 1, wherein are best shown the general features of the invention, the scanning apparatus, indicated generally by the reference numeral 10, is shown as having a housing 11 which has a vertical flat face 12 at one side. At the other side, it is provided with a light tube 13 leading to a scanner 14. A pair of U-shaped arms 15 and 16 are attached to the housing. Each arm is pivotally attached at the free end of one leg to an upper back corner of the housing for hinged movement about a horizontal axis which is perpendicular to the face. The movement can take place from a first position along its respective side of the housing to a second position at a right angle thereto. The faceplate 17 is formed of a transparent plastic and has the same general configuration as the face 12, but is somewhat smaller. It is supported by pivotal attachment to the free end of the other leg of each of the arms 15 and 16. The attachment to the arms is its sole connection with the housing and it is supported in this way at a position parallel to and spaced from the face.

Limited portions 18 and 19 at the upper corners of the faceplate 17 are displaced away from a main portion 21, so as to be parallel to and spaced from the face 12 a greater distance than the said main portion. The main portion 21 is of a generally rectangular shape centered on the face 12 and overlying a horizontal scanning slot (not shown) which extends across the face 12 midway between the upper and lower edges. The main portion 12 has upper and lower edges which terminate in strips 22 and 23 which flare away from the face at substantial angles thereto. The face 12 is provided with parallel vertical guide lines 24 and 25 and these are continued on the faceplate 17 as guide lines 26 and 27.

A horizontal rod 28 is fixed to the top edge of the housing 11 and is supported by abutments 29 and 31 to extend parallel to and spaced from the upper edge of the housing. Copy guide members 32 and 33 are slidably mounted on the rod for adjustment to selected positions, their sliding action on the rod taking place with considerable friction, so that they stay in place despite substantial attempts to dislodge them.

Mounted on the inside surface of the main portion 21 of the faceplate 17 is a copy pressure element 34. The faceplate is bendable relative to its corner support portions 18 and 19 sufficiently to press the pressure element resiliently against the face 12 of the housing. The pressure element is provided with two parallel horizontal rollers 35 and 36 which engage the face 12 on the opposite sides of the horizontal scanning slot (when no copy is in the machine).

Figure 2:
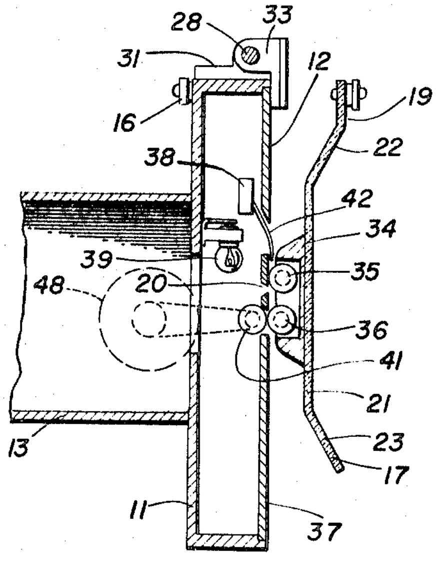
FIG. 2 is a vertical sectional view of a portion of the apparatus taken on the line II—II of FIG. 1.

Referring to FIG. 2, it can be seen that the scanning slot 20 is formed in a plate 37 forming part of the housing 11. A feed means is provided (including the pressure element 34 attached to the faceplate) to move a copy sheet across the face 12 of the housing and over the scanning slot 20 at a predetermined constant rate. A stop means 38 is provided to terminate the action of the feed means when the copy has passed over the slot, but before the copy leaves the pressure element. A row of incandescent bulbs 39 is located in the housing behind the slot to illuminate the copy. A motor driven feed roll 41 extends through the plate 37 in a slot provided therefor just below the scanning slot 20 and engages the bottom row 36 of the pressure element 34. The stop means 38 includes an electrical switch of the usual type having a light-pressure actuating finger 42 which extends through an aperture in the plate provided therefor into the path of the copy as it passes downwardly between the face 12 of the housing and the rollers 35 and 36 of the pressure element 34.

Figure 3:
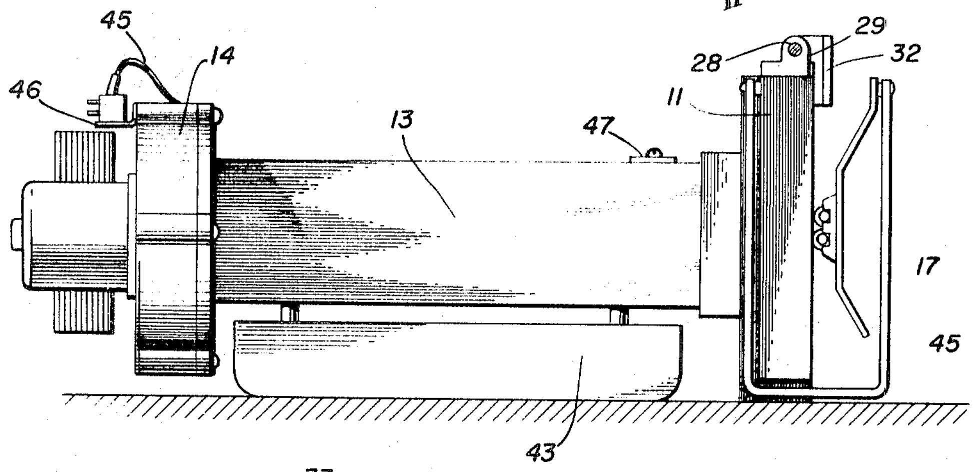
FIG. 3 is a side view of the apparatus.

FIG. 3 shows particularly well the manner in which the entire apparatus is mounted on a chassis 43 fastened to the light tube 13. The scanner 14 is of the typical type shown in the U.S. Pats. Nos. 2,778,873 and 2,854,509 of Nyman and has a drive motor 44 fastened to its outer surface. Various electrical leads 45 enter the apparatus through a junction board 46. An adjustable masking apparatus 47 is mounted on the light tube 13. The bulbs 39 are operated on rectified and filtered alternating current electricity; that is to say, direct current electricity with very little ripple.

The operation of the apparatus will now be readily understood in view of the above description. In operation, the copy sheet is placed against the face 12 between the two guides 32 and 33 and is slid downwardly until it engages the actuating finger 42 of the switch of the stop means 38. This allows the apparatus to operate in its conventional manner and the copy slides downwardly between the face 12 and the roller 35, passes over the scanning slot 20 and then passes between the rollers 41 and 36. The rotation of the feed roller 41, by means of the motor 48 mounted on the slide of the light tube 13, draws the copy over the scanning slot at a steady, predetermined rate. The copy is illuminated by the bulbs 39 and the reflected light passes through the slot 20 down the light tube 13 to the scanner 14 where it is converted to electrical pulses which leave the apparatus through the leads 45. When the copy passes downwardly far enough so that the finger 42 is released, this stops the apparatus and shuts off the motor 48 and the motor 44. The copy is still held between the rolls 36 and 41 and does not fall out onto the floor. It can be seen that, if large copy is to be passed through the machine, the guides 32 and 33 are rotated backwardly about the rod 28 so that they are out of the way. The arms 15 and 16 are moved up so that they are at a right angle to their respective sides of the housing 11. Then, the large copy passes downwardly through the machine and is held in place by the pressure element 34 and the inherent resilience of the faceplate 17 and its mounting in the U-shaped arms 15 and 16. When this large copy is used, of course, the amount of copy actually transmitted is determined by the length of the scanning slot 20 so that only a selected portion of the large sheet is transmitted.

It can be seen, then, that the present invention provides a small, compact scanning apparatus which, nevertheless, is capable of accommodating very large sheets of copy material. The construction is simple and rugged and lends itself to inexpensive manufacture and to wide use.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A scanning apparatus, comprising a. a housing having a flat face on one side and having a light tube and scanner at the other side, b. a support element attached to the housing, c. a faceplate of broad configuration supported only by the support element in a position parallel to and spaced from the face, and d. resilient means connecting plate and housing and causing the faceplate to press toward the said flat face to guide and hold copy.

2. A scanning apparatus as recited in claim 1, wherein the faceplate is formed of a transparent material.

3. A scanning apparatus as recited in claim 2, wherein limited portions at the upper corners of the faceplate are displaced away from a main portion so as to be parallel to and spaced from the face a greater distance than the said main portion.

4. A scanning apparatus as recited in claim 3, wherein the main portion is of a generally rectangular shape centered on the face and overlying a horizontal scanning slot which extends across the face midway between the upper and lower edges, the main portion having upper and lower edges which terminate in strips which flare away from the face at substantial angles thereto.

5. A scanning apparatus as recited in claim 2, wherein the face and the faceplate are both provided with vertical copy guide lines.

6. A scanning apparatus as recited in claim 1, wherein a rod is fixed to the housing to run parallel to and spaced from the upper edge thereof, and wherein copy guide members are slidably mounted on the rod for adjustment to selected positions.

7. A scanning apparatus as recited in claim 4, wherein a copy pressure element is mounted on the surface of the faceplate, the faceplate being bendable relative to its cover support portions to press the pressure element resiliently against the face of the housing.

8. A scanning apparatus as recited in claim 7, wherein the pressure element is provided with two parallel horizontal rollers which engage the face on opposite sides of the scanning slot.

9. A scanning apparatus as recited in claim 1, wherein feed means including a pressure element attached to the face plate is provided to move a copy sheet across the face of the housing over the scanning slot at a predetermined constant rate, and wherein stop means is provided to stop the feed means when the copy has passed over the slot, but before the copy leaves the pressure element.

10. A scanning apparatus as recited in claim 9, wherein the feed means includes a motor-driven roll and the stop means includes an electrical switch having a light-pressure actuating finger adapted to be contacted by the copy sheet.

11. A scanning apparatus, comprising a. a housing having a flat face on one side and having a light tube and scanner at the other side, b. a pair of arms of open loop configuration, each arm being pivotally attached at the free end of one leg to an upper corner of the housing for hinged movement about horizontal axes which are perpendicular to the face from a first position along the respective side of the housing to a second position at a right angle thereto, and c. a faceplate of the same general configuration as the face supported only by pivotal attachment to the free end of the other leg of each arm, the faceplate being supported thereby in a position parallel to and spaced from the face.